(12) United States Patent
Eaton

(10) Patent No.: US 10,611,334 B2
(45) Date of Patent: Apr. 7, 2020

(54) WEB ADJUSTER

(71) Applicant: Shield Restraint Systems, Inc., Elkhart, IN (US)

(72) Inventor: James Russell Eaton, Carmel, IN (US)

(73) Assignee: Shield Restraint Systems, Inc., Elkhart, IN (US)

( * ) Notice: Subject to any disclaimer, the term of this patent is extended or adjusted under 35 U.S.C. 154(b) by 74 days.

(21) Appl. No.: 15/890,239

(22) Filed: Feb. 6, 2018

(65) Prior Publication Data

US 2018/0222439 A1 Aug. 9, 2018

Related U.S. Application Data

(60) Provisional application No. 62/455,915, filed on Feb. 7, 2017.

(51) Int. Cl.
| | |
|---|---|
| *B60R 22/20* | (2006.01) |
| *B60R 22/10* | (2006.01) |
| *B60R 22/30* | (2006.01) |
| *A44B 11/25* | (2006.01) |
| *B60N 2/28* | (2006.01) |

(52) U.S. Cl.
CPC ........ *B60R 22/206* (2013.01); *A44B 11/2549* (2013.01); *A44B 11/2557* (2013.01); *B60N 2/2809* (2013.01); *B60R 22/105* (2013.01); *B60R 22/30* (2013.01)

(58) Field of Classification Search
CPC ................ B60R 22/206; A44B 11/2549; A44B 11/2557
See application file for complete search history.

(56) References Cited

U.S. PATENT DOCUMENTS

| | | | |
|---|---|---|---|
| 906,045 | A | 12/1908 | Martin |
| 1,079,080 | A | 11/1913 | Ward |
| 1,369,456 | A | 2/1921 | Meredith |
| 1,438,898 | A | 12/1922 | Carpmill |
| 1,816,262 | A | 7/1931 | Ritter |

(Continued)

FOREIGN PATENT DOCUMENTS

| | | |
|---|---|---|
| CA | 2036493 A1 | 8/1991 |
| CA | 2038505 A1 | 9/1991 |

(Continued)

OTHER PUBLICATIONS

Britax, "COMPAQ: Convertible Car Seats," Buckle Image, accessed Oct. 12, 2010, www.britax.com.au/car-seats/compaq, 2 pages. This has been publicly available for at least one year prior to this application's filing date.

(Continued)

*Primary Examiner* — Robert Sandy
(74) *Attorney, Agent, or Firm* — Perkins Coie LLP

(57) ABSTRACT

Web adjusters and other web connecting devices for use with restraint systems are described herein. In some embodiments, web adjusters, such as tilt-lock web adjusters, can include web gripping features on an edge portion of a web aperture to prevent a web that is joined to the web adjuster from sliding or otherwise moving to one side of the web aperture or the other when the web is pulled in a direction that is not perpendicular to the edge. In some embodiments, the web gripping features can include alternating recessed and raised edge portions.

20 Claims, 7 Drawing Sheets

(56) References Cited

U.S. PATENT DOCUMENTS

| | | |
|---|---|---|
| 1,930,378 A | 10/1933 | Beagan |
| 2,132,556 A | 10/1938 | Blackshaw |
| 2,255,258 A | 9/1941 | Lethern et al. |
| 2,372,557 A | 3/1945 | Dowd |
| 2,393,178 A | 1/1946 | Manson |
| 2,437,585 A | 3/1948 | Zimmern |
| 2,482,693 A | 9/1949 | Rogers et al. |
| 2,538,641 A | 1/1951 | Elsner |
| 2,549,841 A | 4/1951 | Morrow et al. |
| 2,639,852 A | 5/1953 | Sanders et al. |
| 2,641,813 A | 6/1953 | Loxham |
| 2,668,997 A | 2/1954 | Irvin et al. |
| 2,710,999 A | 6/1955 | Davis |
| 2,763,451 A | 9/1956 | Moran |
| 2,803,864 A | 8/1957 | Bishaf |
| 2,845,233 A | 7/1958 | Pfankuch et al. |
| 2,846,745 A | 8/1958 | Lathrop |
| 2,869,200 A | 1/1959 | Phillips et al. |
| 2,876,516 A | 3/1959 | Cummings |
| 2,892,232 A | 6/1959 | Quilter |
| 2,893,088 A | 7/1959 | Harper et al. |
| 2,899,732 A | 8/1959 | Cushman |
| 2,901,794 A | 9/1959 | Prete, Jr. |
| 2,921,353 A | 1/1960 | Cushman |
| 2,938,254 A | 5/1960 | Gaylord |
| D188,897 S | 9/1960 | Prete, Jr. |
| 2,964,815 A | 12/1960 | Sereno |
| 2,965,942 A | 12/1960 | Carter |
| 3,029,487 A | 4/1962 | Shinichiro |
| 3,034,596 A | 5/1962 | Twaits, Jr. |
| 3,074,760 A | 1/1963 | Hodgekin et al. |
| 3,084,411 A | 4/1963 | Lindblad |
| 3,091,010 A | 5/1963 | Davis |
| 3,104,440 A | 9/1963 | Davis |
| 3,110,071 A | 11/1963 | Higuchi |
| 3,118,208 A | 1/1964 | Wexler |
| 3,132,399 A | 5/1964 | Cooper |
| 3,137,907 A | 6/1964 | Unai |
| D198,566 S | 7/1964 | Holmberg |
| 3,142,103 A | 7/1964 | Lindblad |
| 3,142,968 A | 8/1964 | Basham et al. |
| 3,145,442 A | 8/1964 | Brown |
| 3,165,805 A | 1/1965 | Lower |
| 3,178,226 A | 4/1965 | Cates |
| 3,179,992 A | 4/1965 | Murphy, Sr. |
| 3,183,568 A | 5/1965 | Gaylord |
| 3,189,963 A | 6/1965 | Warner et al. |
| 3,218,685 A | 11/1965 | Atumi |
| 3,226,791 A | 1/1966 | Carter |
| 3,233,941 A | 2/1966 | Selzer |
| 3,256,576 A | 6/1966 | Klove, Jr. et al. |
| 3,262,169 A | 7/1966 | Jantzen |
| 3,287,062 A | 11/1966 | Board et al. |
| 3,289,261 A | 12/1966 | Davis |
| 3,293,713 A | 12/1966 | Gaylord |
| 3,306,662 A | 2/1967 | Finnigan |
| 3,312,502 A | 4/1967 | Coe |
| 3,323,829 A | 6/1967 | Liem |
| 3,369,842 A | 2/1968 | Adams et al. |
| 3,380,776 A | 4/1968 | Dillender |
| 3,414,947 A | 12/1968 | Holmberg et al. |
| 3,428,029 A | 2/1969 | Klickstein et al. |
| 3,451,720 A | 6/1969 | Makinen |
| 3,473,201 A | 10/1969 | Hopka et al. |
| 3,491,414 A | 1/1970 | Stoffel |
| 3,505,711 A | 4/1970 | Carter |
| 3,523,342 A | 8/1970 | Spires |
| D218,589 S | 9/1970 | Lohr |
| 3,564,672 A | 2/1971 | McIntyre |
| 3,576,056 A | 4/1971 | Barcus |
| 3,591,900 A | 7/1971 | Brown |
| 3,605,207 A | 9/1971 | Glauser et al. |
| 3,605,210 A | 9/1971 | Lohr |
| 3,631,571 A | 1/1972 | Stoffel |
| 3,639,948 A | 2/1972 | Sherman |
| 3,644,967 A | 2/1972 | Romanzi, Jr. et al. |
| 3,648,333 A | 3/1972 | Stoffel |
| 3,658,281 A | 4/1972 | Gaylord |
| 3,673,645 A | 7/1972 | Burleigh |
| 3,678,542 A | 7/1972 | Prete, Jr. |
| 3,695,696 A | 10/1972 | Lohr et al. |
| 3,714,684 A | 2/1973 | Gley |
| 3,744,102 A | 7/1973 | Gaylord |
| 3,744,103 A | 7/1973 | Gaylord |
| 3,747,167 A | 7/1973 | Pravaz |
| 3,760,464 A | 9/1973 | Higuchi |
| 3,766,611 A | 10/1973 | Gaylord |
| 3,766,612 A | 10/1973 | Hattori |
| 3,775,813 A | 12/1973 | Higuchi |
| 3,825,979 A | 7/1974 | Jakob |
| 3,827,716 A | 8/1974 | Vaughn et al. |
| 3,856,351 A | 12/1974 | Garvey |
| 3,872,550 A | 3/1975 | Yang |
| 3,879,810 A | 4/1975 | Prete, Jr. et al. |
| 3,898,715 A | 8/1975 | Balder |
| 3,935,618 A | 2/1976 | Fohl |
| 3,964,138 A | 6/1976 | Gaylord |
| 3,975,800 A | 8/1976 | Farlind |
| 3,986,234 A | 10/1976 | Frost et al. |
| 3,995,885 A | 12/1976 | Plesniarski |
| 4,018,399 A | 4/1977 | Rex |
| 4,026,245 A | 5/1977 | Arthur |
| 4,051,743 A | 10/1977 | Gaylord |
| 4,095,313 A | 6/1978 | Piljay et al. |
| D248,618 S | 7/1978 | Anthony |
| 4,100,657 A | 7/1978 | Minolla |
| 4,118,833 A | 10/1978 | Knox et al. |
| 4,128,924 A | 12/1978 | Happel et al. |
| 4,136,422 A | 1/1979 | Ivanov et al. |
| 4,148,224 A | 4/1979 | Craig |
| 4,181,832 A | 1/1980 | Ueda |
| 4,184,234 A | 1/1980 | Anthony et al. |
| 4,185,363 A | 1/1980 | David |
| 4,196,500 A | 4/1980 | Happel et al. |
| 4,220,294 A | 9/1980 | Dipaola |
| 4,228,567 A | 10/1980 | Ikesue et al. |
| 4,239,260 A | 12/1980 | Hollowell |
| 4,253,623 A | 3/1981 | Steger et al. |
| 4,262,396 A | 4/1981 | Koike |
| 4,273,301 A | 6/1981 | Frankila |
| 4,302,049 A | 11/1981 | Simpson |
| 4,317,263 A | 3/1982 | Fohl |
| 4,321,734 A | 3/1982 | Gandelrnan |
| 4,323,204 A | 4/1982 | Takada |
| 4,334,341 A | 6/1982 | Krautz et al. |
| 4,336,636 A | 6/1982 | Ishiguro et al. |
| 4,344,588 A | 8/1982 | Hollowell et al. |
| 4,366,604 A | 1/1983 | Anthony et al. |
| 4,385,425 A | 5/1983 | Tanaka et al. |
| 4,403,376 A | 9/1983 | Palloks |
| 4,408,374 A | 10/1983 | Fohl |
| 4,419,874 A | 12/1983 | Brentini |
| 4,425,688 A | 1/1984 | Anthony et al. |
| 4,428,103 A | 1/1984 | Wier et al. |
| 4,454,634 A | 6/1984 | Haglund et al. |
| D274,861 S | 7/1984 | Lindblad |
| 4,457,052 A | 7/1984 | Hauber |
| 4,457,251 A | 7/1984 | Weman et al. |
| 4,487,454 A | 12/1984 | Biller |
| 4,491,343 A | 1/1985 | Fohl |
| 4,525,901 A | 7/1985 | Krauss |
| 4,545,097 A | 10/1985 | Wier |
| 4,549,769 A | 10/1985 | Pilarski |
| 4,555,831 A | 12/1985 | Otzen et al. |
| 4,562,625 A | 1/1986 | Hunter, Jr. et al. |
| 4,569,535 A | 2/1986 | Haglund et al. |
| 4,574,911 A | 3/1986 | North et al. |
| 4,587,696 A | 5/1986 | Morinaga et al. |
| 4,588,208 A | 5/1986 | Yoshitsugu et al. |
| D285,383 S | 9/1986 | Anthony |
| 4,617,705 A | 10/1986 | Anthony et al. |
| 4,637,099 A | 1/1987 | Kasai |
| 4,637,102 A | 1/1987 | Teder et al. |
| 4,638,533 A | 1/1987 | Gloomis et al. |

(56) References Cited

U.S. PATENT DOCUMENTS

| | | |
|---|---|---|
| 4,640,550 A | 2/1987 | Hakansson |
| 4,644,618 A | 2/1987 | Holmberg et al. |
| 4,646,400 A | 3/1987 | Tanaka |
| 4,648,483 A | 3/1987 | Skyba |
| 4,650,214 A | 3/1987 | Higbee |
| 4,651,946 A | 3/1987 | Anthony et al. |
| 4,656,700 A | 4/1987 | Tanaka et al. |
| 4,660,889 A | 4/1987 | Anthony et al. |
| 4,679,852 A | 7/1987 | Anthony et al. |
| 4,682,791 A | 7/1987 | Ernst |
| 4,685,176 A | 8/1987 | Burnside |
| 4,692,970 A | 9/1987 | Anthony et al. |
| 4,711,003 A | 12/1987 | Gelula |
| 4,716,630 A | 1/1988 | Skyba |
| 4,720,148 A | 1/1988 | Anthony et al. |
| 4,726,625 A | 2/1988 | Bougher |
| 4,727,628 A | 3/1988 | Rudholm |
| 4,733,444 A | 3/1988 | Takada |
| 4,738,485 A | 4/1988 | Rumpf |
| 4,741,574 A | 5/1988 | Weightman et al. |
| 4,742,604 A | 5/1988 | Mazelsky |
| D296,678 S | 7/1988 | Lortz et al. |
| 4,757,579 A | 7/1988 | Nishino et al. |
| 4,758,048 A | 7/1988 | Shuman |
| 4,766,654 A | 8/1988 | Sugimoto |
| 4,786,078 A | 11/1988 | Schreier et al. |
| 4,786,080 A | 11/1988 | Jay |
| 4,790,597 A | 12/1988 | Bauer et al. |
| 4,809,409 A | 3/1989 | Van Riesen |
| 4,832,410 A | 5/1989 | Bougher |
| 4,843,688 A | 7/1989 | Ikeda |
| 4,854,607 A | 8/1989 | Mandracchia et al. |
| 4,854,608 A | 8/1989 | Barral |
| D303,232 S | 9/1989 | Lortz et al. |
| 4,876,770 A | 10/1989 | Bougher |
| 4,876,772 A | 10/1989 | Anthony et al. |
| 4,884,652 A | 12/1989 | Vollmer |
| 4,901,407 A | 2/1990 | Pandola et al. |
| 4,903,377 A | 2/1990 | Doty |
| 4,911,377 A | 3/1990 | Lortz et al. |
| 4,919,484 A | 4/1990 | Bougher et al. |
| 4,927,211 A | 5/1990 | Bolcerek |
| 4,934,030 A | 6/1990 | Spinosa et al. |
| 4,940,254 A | 7/1990 | Ueno |
| 4,942,649 A | 7/1990 | Anthony et al. |
| 4,995,640 A | 2/1991 | Saito |
| 5,015,010 A | 5/1991 | Homeier et al. |
| 5,023,981 A | 6/1991 | Anthony et al. |
| 5,026,093 A | 6/1991 | Nishikaji |
| 5,029,369 A | 7/1991 | Oberhardt et al. |
| 5,031,962 A | 7/1991 | Lee |
| 5,038,446 A | 8/1991 | Anthony et al. |
| 5,039,169 A | 8/1991 | Bougher et al. |
| 5,046,687 A | 9/1991 | Herndon |
| 5,050,274 A | 9/1991 | Staniszewski et al. |
| 5,054,815 A | 10/1991 | Gavagan |
| 5,058,244 A | 10/1991 | Fernandez |
| 5,067,212 A | 11/1991 | Ellis |
| 5,074,011 A | 12/1991 | Carlson |
| 5,074,588 A | 12/1991 | Huspen |
| 5,084,946 A | 2/1992 | Lee |
| 5,088,160 A | 2/1992 | Warrick |
| 5,088,163 A | 2/1992 | van Riesen |
| 5,097,572 A | 3/1992 | Warrick |
| 5,100,176 A | 3/1992 | Ball et al. |
| D327,455 S | 6/1992 | Blair |
| 5,119,532 A | 6/1992 | Tanaka |
| 5,123,147 A | 6/1992 | Blair |
| 5,123,153 A | 6/1992 | Krauss |
| 5,123,673 A | 6/1992 | Tame |
| 5,142,748 A | 9/1992 | Anthony et al. |
| 5,159,732 A | 11/1992 | Burke |
| 5,160,186 A | 11/1992 | Lee |
| 5,165,149 A | 11/1992 | Nihei |
| 5,170,539 A | 12/1992 | Lundstedt et al. |
| D332,433 S | 1/1993 | Bougher |
| 5,176,402 A | 1/1993 | Coulon |
| 5,182,837 A | 2/1993 | Anthony et al. |
| 5,219,206 A | 6/1993 | Anthony et al. |
| 5,219,207 A | 6/1993 | Anthony et al. |
| 5,220,713 A | 6/1993 | Lane, Jr. et al. |
| D338,119 S | 8/1993 | Merrick |
| 5,234,181 A | 8/1993 | Schroth |
| 5,236,220 A | 8/1993 | Mills |
| 5,248,187 A | 9/1993 | Harrison |
| D342,465 S | 12/1993 | Anthony et al. |
| 5,267,377 A | 12/1993 | Gillis et al. |
| 5,269,051 A | 12/1993 | McFalls |
| 5,272,770 A | 12/1993 | Allen et al. |
| 5,282,672 A | 2/1994 | Borlinghaus |
| 5,282,706 A | 2/1994 | Anthony et al. |
| 5,283,933 A | 2/1994 | Wiseman et al. |
| 5,286,057 A | 2/1994 | Forster |
| 5,286,090 A | 2/1994 | Templin et al. |
| 5,292,181 A | 3/1994 | Dybro |
| 5,301,371 A | 4/1994 | Chao |
| 5,306,044 A | 4/1994 | Tucker |
| 5,307,542 A | 5/1994 | Murai |
| 5,308,148 A | 5/1994 | Peterson et al. |
| 5,311,653 A | 5/1994 | Merrick |
| 5,332,968 A | 7/1994 | Brown |
| 5,350,195 A | 9/1994 | Brown |
| 5,350,196 A | 9/1994 | Atkins |
| 5,364,048 A | 11/1994 | Fujimura et al. |
| 5,369,855 A | 12/1994 | Tokugawa |
| 5,370,333 A | 12/1994 | Lortz et al. |
| 5,375,879 A | 12/1994 | Williams et al. |
| 5,380,066 A | 1/1995 | Wiseman et al. |
| 5,392,535 A | 2/1995 | Van Noy et al. |
| 5,397,171 A | 3/1995 | Leach |
| 5,403,038 A | 4/1995 | Mcfalls |
| 5,406,681 A | 4/1995 | Olson |
| 5,411,292 A | 5/1995 | Collins et al. |
| 5,416,957 A | 5/1995 | Renzi, Sr. et al. |
| D359,710 S | 6/1995 | Chinni et al. |
| 5,432,987 A | 7/1995 | Schroth |
| 5,435,272 A | 7/1995 | Epstein |
| 5,443,302 A | 8/1995 | Dybro |
| D362,415 S | 9/1995 | Takimoto |
| 5,451,094 A | 9/1995 | Templin et al. |
| D364,124 S | 11/1995 | Lortz et al. |
| 5,471,714 A | 12/1995 | Olson |
| 5,495,646 A | 3/1996 | Scrutchfield et al. |
| 5,497,956 A | 3/1996 | Crook |
| 5,511,856 A | 4/1996 | Merrick et al. |
| 5,516,199 A | 5/1996 | Crook et al. |
| 5,526,556 A | 6/1996 | Czank |
| 5,529,343 A | 6/1996 | Klink |
| 5,540,403 A | 7/1996 | Standley |
| 5,547,223 A | 8/1996 | Koketsu et al. |
| 5,560,565 A | 10/1996 | Merrick et al. |
| 5,561,891 A | 10/1996 | Hsieh |
| 5,566,431 A | 10/1996 | Haglund |
| 5,568,676 A | 10/1996 | Freeman |
| 5,570,933 A | 11/1996 | Rouhana et al. |
| 5,577,683 A | 11/1996 | Imai |
| 5,579,785 A | 12/1996 | Bell |
| 5,584,107 A | 12/1996 | Koyanagi et al. |
| 5,588,189 A | 12/1996 | Gorman et al. |
| 5,606,783 A | 3/1997 | Gillis et al. |
| 5,622,327 A | 4/1997 | Heath et al. |
| 5,628,548 A | 5/1997 | Lacoste |
| 5,634,664 A | 6/1997 | Seki et al. |
| 5,640,468 A | 6/1997 | Hsu |
| 5,658,012 A | 8/1997 | Villarreal et al. |
| 5,669,572 A | 9/1997 | Crook |
| 5,695,243 A | 12/1997 | Anthony et al. |
| 5,699,594 A | 12/1997 | Czank et al. |
| D389,426 S | 1/1998 | Merrick et al. |
| 5,718,455 A | 2/1998 | Kawaguchi et al. |
| 5,722,689 A | 3/1998 | Chen et al. |
| 5,743,597 A | 4/1998 | Jessup et al. |
| 5,765,774 A | 6/1998 | Maekawa et al. |
| 5,774,947 A | 7/1998 | Anscher |

(56) References Cited

U.S. PATENT DOCUMENTS

| | | |
|---|---|---|
| 5,779,319 A | 7/1998 | Merrick |
| D397,063 S | 8/1998 | Woellert et al. |
| 5,788,280 A | 8/1998 | Ohsumi |
| 5,788,281 A | 8/1998 | Yanagi et al. |
| 5,788,282 A | 8/1998 | Lewis |
| 5,794,878 A | 8/1998 | Carpenter et al. |
| 5,806,148 A | 9/1998 | Mcfalls et al. |
| 5,813,097 A | 9/1998 | Woellert et al. |
| 5,839,793 A | 11/1998 | Merrick et al. |
| 5,857,247 A | 1/1999 | Warrick et al. |
| 5,873,599 A | 2/1999 | Bauer et al. |
| 5,873,635 A | 2/1999 | Merrick |
| 5,882,084 A | 3/1999 | Verellen et al. |
| D407,667 S | 4/1999 | Homeier |
| 5,908,223 A | 6/1999 | Miller |
| 5,915,630 A | 6/1999 | Step |
| 5,934,760 A | 8/1999 | Schroth |
| D416,827 S | 11/1999 | Anthony et al. |
| 5,979,026 A | 11/1999 | Anthony |
| 5,979,982 A | 11/1999 | Nakagawa |
| 5,996,192 A | 12/1999 | Haines et al. |
| 6,003,899 A | 12/1999 | Chaney |
| 6,017,087 A | 1/2000 | Anthony et al. |
| 6,056,320 A | 5/2000 | Khalifa et al. |
| 6,065,367 A | 5/2000 | Schroth |
| 6,065,777 A | 5/2000 | Merrick |
| 6,123,388 A | 9/2000 | Vits et al. |
| 6,182,783 B1 | 2/2001 | Bayley |
| RE37,123 E | 4/2001 | Templin et al. |
| 6,224,154 B1 | 5/2001 | Stoki |
| 6,230,370 B1 | 5/2001 | Nelsen |
| 6,260,884 B1 | 7/2001 | Bittner et al. |
| 6,295,700 B1 | 10/2001 | Plzak |
| 6,309,024 B1 | 10/2001 | Busch |
| 6,312,015 B1 | 11/2001 | Merrick et al. |
| 6,315,232 B1 | 11/2001 | Merrick |
| 6,322,140 B1 | 11/2001 | Jessup et al. |
| 6,322,149 B1 | 11/2001 | Conforti et al. |
| 6,325,412 B1 | 12/2001 | Pan |
| 6,328,379 B1 | 12/2001 | Merrick et al. |
| 6,343,841 B1 | 2/2002 | Gregg et al. |
| 6,351,717 B2 | 2/2002 | Lambrecht |
| 6,357,790 B1 | 3/2002 | Swann et al. |
| 6,358,591 B1 | 3/2002 | Smith |
| 6,363,591 B1 | 4/2002 | Bell et al. |
| 6,367,882 B1 | 4/2002 | Van Druff et al. |
| 6,374,168 B1 | 4/2002 | Fujii |
| 6,400,145 B1 | 6/2002 | Chamings et al. |
| 6,412,863 B1 | 7/2002 | Merrick et al. |
| 6,418,596 B2 | 7/2002 | Haas |
| 6,425,632 B1 | 7/2002 | Anthony et al. |
| 6,442,807 B1 | 9/2002 | Adkisson |
| 6,446,272 B1 | 9/2002 | Lee |
| 6,463,638 B1 | 10/2002 | Pontaoe |
| 6,467,849 B1 | 10/2002 | Deptolla |
| 6,485,057 B1 | 11/2002 | Midorikawa et al. |
| 6,485,098 B1 | 11/2002 | Vits et al. |
| 6,508,515 B2 | 1/2003 | Vits et al. |
| 6,513,208 B1 | 2/2003 | Sack et al. |
| 6,520,392 B2 | 2/2003 | Thibodeau et al. |
| 6,543,101 B2 | 4/2003 | Sack et al. |
| 6,547,273 B2 | 4/2003 | Grace et al. |
| 6,560,825 B2 | 5/2003 | Maciejczyk |
| 6,566,869 B2 | 5/2003 | Chamings et al. |
| 6,588,077 B2 | 7/2003 | Katsuyama et al. |
| 6,592,149 B2 | 7/2003 | Sessoms |
| 6,606,770 B1 | 8/2003 | Badrenas Buscart |
| 6,619,753 B2 | 9/2003 | Takayama |
| 6,631,926 B2 | 10/2003 | Merrick et al. |
| 6,665,912 B2 | 12/2003 | Turner et al. |
| 6,694,577 B2 | 2/2004 | Di Perrero |
| 6,711,790 B2 | 3/2004 | Pontaoe |
| 6,719,233 B2 | 4/2004 | Specht et al. |
| 6,719,326 B2 | 4/2004 | Schroth et al. |
| 6,722,601 B2 | 4/2004 | Kohlndorfer et al. |
| 6,722,697 B2 | 4/2004 | Krauss et al. |
| 6,733,041 B2 | 5/2004 | Arnold et al. |
| 6,739,541 B2 | 5/2004 | Palliser et al. |
| 6,749,150 B2 | 6/2004 | Kohlndorfer et al. |
| 6,763,557 B2 | 7/2004 | Steiff et al. |
| 6,769,157 B1 | 8/2004 | Meal |
| 6,786,294 B2 | 9/2004 | Specht |
| 6,786,510 B2 | 9/2004 | Roychoudhury et al. |
| 6,786,511 B2 | 9/2004 | Heckmayr |
| 6,793,291 B1 | 9/2004 | Kocher |
| 6,796,007 B1 | 9/2004 | Anscher |
| 6,802,470 B2 | 10/2004 | Smithson et al. |
| 6,820,310 B2 | 11/2004 | Woodard et al. |
| 6,820,902 B2 | 11/2004 | Kim |
| 6,834,822 B2 | 12/2004 | Koning et al. |
| 6,836,754 B2 | 12/2004 | Cooper |
| 6,837,519 B2 | 1/2005 | Moskalik et al. |
| 6,840,544 B2 | 1/2005 | Prentkowski |
| 6,851,160 B2 | 2/2005 | Carver |
| 6,857,326 B2 | 2/2005 | Specht et al. |
| 6,860,671 B2 | 3/2005 | Schulz |
| 6,863,235 B2 | 3/2005 | Koning et al. |
| 6,863,236 B2 | 3/2005 | Kernpf et al. |
| 6,868,585 B2 | 3/2005 | Anthony et al. |
| 6,868,591 B2 | 3/2005 | Dingman et al. |
| 6,871,876 B2 | 3/2005 | Xu |
| 6,874,819 B2 | 4/2005 | O'Neill |
| 6,882,914 B2 | 4/2005 | Gioutsos et al. |
| 6,886,889 B2 | 5/2005 | Vits et al. |
| 6,896,291 B1 | 5/2005 | Peterson |
| 6,902,193 B2 | 6/2005 | Kim et al. |
| 6,913,288 B2 | 7/2005 | Schulz et al. |
| 6,916,045 B2 | 7/2005 | Clancy, III et al. |
| 6,921,136 B2 | 7/2005 | Bell et al. |
| 6,922,875 B2 | 8/2005 | Sato et al. |
| 6,931,669 B2 | 8/2005 | Ashline |
| 6,935,701 B1 | 8/2005 | Arnold et al. |
| 6,951,350 B2 | 10/2005 | Heidorn et al. |
| 6,957,789 B2 | 10/2005 | Bowman et al. |
| 6,959,946 B2 | 11/2005 | Desmarais et al. |
| 6,962,394 B2 | 11/2005 | Anthony et al. |
| 6,966,518 B2 | 11/2005 | Kohlndorfer et al. |
| 6,969,022 B2 | 11/2005 | Bell et al. |
| 6,969,122 B2 | 11/2005 | Sachs et al. |
| 6,993,436 B2 | 1/2006 | Specht et al. |
| 6,997,474 B2 | 2/2006 | Midorikawa et al. |
| 6,997,479 B2 | 2/2006 | Desmarais et al. |
| 7,010,836 B2 | 3/2006 | Acton et al. |
| D519,406 S | 4/2006 | Merrill et al. |
| 7,025,297 B2 | 4/2006 | Bell et al. |
| 7,029,067 B2 | 4/2006 | Vits et al. |
| 7,040,696 B2 | 5/2006 | Vits et al. |
| 7,065,843 B1 | 6/2006 | Wu |
| 7,073,866 B1 | 7/2006 | Berdahl |
| 7,077,475 B2 | 7/2006 | Boyle |
| 7,080,856 B2 | 7/2006 | Desmarais et al. |
| 7,083,147 B2 | 8/2006 | Movsesian et al. |
| 7,100,991 B2 | 9/2006 | Schroth |
| 7,108,114 B2 | 9/2006 | Mori et al. |
| 7,118,133 B2 | 10/2006 | Bell et al. |
| 7,131,667 B2 | 11/2006 | Bell et al. |
| 7,137,648 B2 | 11/2006 | Schulz et al. |
| 7,137,650 B2 | 11/2006 | Bell et al. |
| 7,140,571 B2 | 11/2006 | Hishon et al. |
| 7,144,085 B2 | 12/2006 | Vits et al. |
| 7,147,251 B2 | 12/2006 | Bell et al. |
| D535,214 S | 1/2007 | Kolasa |
| 7,159,285 B2 | 1/2007 | Karlsson |
| 7,180,258 B2 | 2/2007 | Specht et al. |
| 7,182,370 B2 | 2/2007 | Arnold |
| 7,210,707 B2 | 5/2007 | Schroth |
| 7,216,827 B2 | 5/2007 | Tanaka et al. |
| 7,219,929 B2 | 5/2007 | Bell et al. |
| 7,232,154 B2 | 6/2007 | Desmarais et al. |
| 7,237,741 B2 | 7/2007 | Specht |
| 7,240,405 B2 | 7/2007 | Webber et al. |
| 7,240,924 B2 | 7/2007 | Kohlndorfer et al. |
| 7,246,854 B2 | 7/2007 | Dingman et al. |
| 7,263,750 B2 | 9/2007 | Keene et al. |

(56) References Cited

U.S. PATENT DOCUMENTS

| | | |
|---|---|---|
| 7,278,684 B2 | 10/2007 | Boyle |
| D555,358 S | 11/2007 | King |
| 7,300,013 B2 | 11/2007 | Morgan et al. |
| 7,306,260 B1 | 12/2007 | Park et al. |
| 7,341,216 B2 | 3/2008 | Heckmayr |
| 7,360,287 B2 | 4/2008 | Cerruti et al. |
| 7,367,590 B2 | 5/2008 | Koning et al. |
| 7,377,464 B2 | 5/2008 | Morgan |
| 7,384,014 B2 | 6/2008 | Ver Hoven et al. |
| 7,395,585 B2 | 7/2008 | Longley et al. |
| 7,404,239 B1 | 7/2008 | Walton et al. |
| 7,407,193 B2 | 8/2008 | Yamaguchi et al. |
| D578,931 S | 10/2008 | Toltzman et al. |
| 7,452,003 B2 | 11/2008 | Bell |
| 7,455,256 B2 | 11/2008 | Morgan |
| 7,461,866 B2 | 12/2008 | Desmarais et al. |
| 7,475,840 B2 | 1/2009 | Heckmayr |
| 7,477,139 B1 | 1/2009 | Cuevas |
| 7,481,399 B2 | 1/2009 | Nöhren et al. |
| 7,506,413 B2 | 3/2009 | Dingman et al. |
| 7,516,808 B2 | 4/2009 | Tanaka |
| 7,520,036 B1 | 4/2009 | Baldwin et al. |
| D592,543 S | 5/2009 | Kolasa |
| D592,830 S | 5/2009 | Whiteside |
| 7,533,902 B2 | 5/2009 | Arnold et al. |
| 7,547,043 B2 | 6/2009 | Kokeguchi et al. |
| D603,753 S | 11/2009 | Palmer et al. |
| 7,614,124 B2 | 11/2009 | Keene et al. |
| 7,631,830 B2 | 12/2009 | Boelstler et al. |
| 7,669,794 B2 | 3/2010 | Boelstler et al. |
| 7,673,945 B1 | 3/2010 | Riffel et al. |
| 7,698,791 B2 | 4/2010 | Pezza |
| 7,716,794 B2 | 5/2010 | Wu |
| 7,716,795 B2 | 5/2010 | Versellie et al. |
| 7,722,081 B2 | 5/2010 | Van Druff et al. |
| 7,739,019 B2 | 6/2010 | Robert et al. |
| 7,753,410 B2 | 7/2010 | Coultrup |
| 7,775,557 B2 | 8/2010 | Boström et al. |
| 7,794,024 B1 | 9/2010 | Kranz et al. |
| RE41,790 E | 10/2010 | Stanley |
| 7,861,341 B2 | 1/2011 | Ayette et al. |
| 7,862,124 B2 | 1/2011 | Dingman |
| 7,871,132 B2 | 1/2011 | Rogers |
| D632,611 S | 2/2011 | Buscart |
| D637,518 S | 5/2011 | Chen |
| 7,934,775 B2 | 5/2011 | Walker et al. |
| 7,945,975 B2 | 5/2011 | Thomas et al. |
| 8,011,730 B2 | 9/2011 | Greenwood |
| 8,037,581 B2 | 10/2011 | Gray et al. |
| 8,096,027 B2 | 1/2012 | Jung et al. |
| 8,240,012 B2 | 8/2012 | Walega et al. |
| 8,240,767 B2 | 8/2012 | Greenwood |
| 8,256,073 B2 | 9/2012 | Zhang |
| 8,381,373 B2 | 2/2013 | Jung |
| 8,387,216 B1 | 3/2013 | Martinson |
| 8,468,660 B2 | 6/2013 | Holler |
| 8,567,022 B2 | 10/2013 | Keene et al. |
| 8,627,554 B1 | 1/2014 | Hagan et al. |
| 8,641,096 B1 | 2/2014 | Kohlndorfer et al. |
| D729,119 S | 5/2015 | Janes |
| D748,529 S | 2/2016 | Paik et al. |
| 9,656,752 B2 | 5/2017 | Valdes et al. |
| 9,821,913 B1 | 11/2017 | Adkins et al. |
| 2002/0050707 A1 | 5/2002 | Nishide et al. |
| 2002/0089163 A1 | 7/2002 | Bedewi et al. |
| 2002/0135175 A1 | 9/2002 | Schroth |
| 2002/0145279 A1 | 10/2002 | Murray |
| 2003/0015863 A1 | 1/2003 | Brown et al. |
| 2003/0027917 A1 | 2/2003 | Namiki et al. |
| 2003/0085608 A1 | 5/2003 | Girardin |
| 2004/0066291 A1 | 4/2004 | Tracy et al. |
| 2004/0084953 A1 | 5/2004 | Hansen |
| 2004/0169411 A1 | 9/2004 | Murray |
| 2004/0174063 A1 | 9/2004 | Kocher |
| 2004/0217583 A1 | 11/2004 | Wang |
| 2004/0227390 A1 | 11/2004 | Schroth |
| 2004/0251367 A1 | 12/2004 | Suzuki et al. |
| 2005/0044671 A1 | 3/2005 | Yates |
| 2005/0073187 A1 | 4/2005 | Frank et al. |
| 2005/0107932 A1 | 5/2005 | Bolz et al. |
| 2005/0127660 A1 | 6/2005 | Liu |
| 2005/0175253 A1 | 8/2005 | Li et al. |
| 2005/0179244 A1 | 8/2005 | Schroth |
| 2005/0206151 A1 | 9/2005 | Ashline |
| 2005/0284977 A1 | 12/2005 | Specht et al. |
| 2006/0071535 A1 | 4/2006 | Kim et al. |
| 2006/0075609 A1 | 4/2006 | Dingman et al. |
| 2006/0090313 A1 | 5/2006 | Muromachi et al. |
| 2006/0097095 A1 | 5/2006 | Boast |
| 2006/0237573 A1 | 10/2006 | Boelstler et al. |
| 2006/0243070 A1 | 11/2006 | Van Druff et al. |
| 2006/0267394 A1 | 11/2006 | David et al. |
| 2006/0277727 A1 | 12/2006 | Keene et al. |
| 2007/0052255 A1 | 3/2007 | O'Connor |
| 2007/0080528 A1 | 4/2007 | Itoga et al. |
| 2007/0241549 A1 | 10/2007 | Boelstler et al. |
| 2007/0257480 A1 | 11/2007 | Van Gruff et al. |
| 2008/0018156 A1 | 1/2008 | Hammarskjold et al. |
| 2008/0030013 A1 | 2/2008 | Burghardt |
| 2008/0054615 A1 | 3/2008 | Coultrup |
| 2008/0087754 A1 | 4/2008 | Aihara et al. |
| 2008/0093833 A1 | 4/2008 | Odate |
| 2008/0100051 A1 | 5/2008 | Bell et al. |
| 2008/0100122 A1 | 5/2008 | Bell et al. |
| 2008/0136246 A1 | 6/2008 | Salter |
| 2008/0172847 A1 | 7/2008 | Keene et al. |
| 2008/0224460 A1 | 9/2008 | Erez |
| 2009/0014991 A1 | 1/2009 | Smyth et al. |
| 2009/0069983 A1 | 3/2009 | Humbert et al. |
| 2009/0179412 A1 | 7/2009 | Gray et al. |
| 2009/0183348 A1 | 7/2009 | Walton et al. |
| 2009/0212549 A1 | 8/2009 | Jones |
| 2009/0241305 A1 | 10/2009 | Buckingham |
| 2010/0046843 A1 | 2/2010 | Ma et al. |
| 2010/0115737 A1 | 5/2010 | Foubert |
| 2010/0125983 A1 | 5/2010 | Keene et al. |
| 2010/0146749 A1 | 6/2010 | Jung |
| 2010/0213753 A1 | 8/2010 | Humbert |
| 2010/0219667 A1 | 9/2010 | Merrill et al. |
| 2011/0010901 A1 | 1/2011 | Holler |
| 2011/0016678 A1 | 1/2011 | Bergkvist |
| 2011/0043402 A1 | 2/2011 | Sasakawa |
| 2011/0057500 A1 | 3/2011 | Walker et al. |
| 2011/0133439 A1 | 6/2011 | Pearce et al. |
| 2011/0162175 A1 | 7/2011 | Gnesda et al. |
| 2012/0242134 A1 | 9/2012 | Siegel |
| 2012/0284966 A1 | 11/2012 | Greaves et al. |
| 2012/0292893 A1 | 11/2012 | Baca et al. |
| 2013/0127229 A1 | 5/2013 | Hurnbert |
| 2013/0147242 A1 | 6/2013 | Santana-Gallego et al. |
| 2013/0212845 A1 | 8/2013 | Ford et al. |
| 2014/0230202 A1 | 8/2014 | Humbert et al. |
| 2015/0042078 A1 | 2/2015 | Gehret et al. |
| 2015/0074951 A1* | 3/2015 | Grimm ............... A44B 11/006 24/190 |
| 2017/0008632 A1 | 1/2017 | Eberle et al. |
| 2017/0203847 A1 | 7/2017 | Browning et al. |
| 2017/0225649 A1 | 8/2017 | Shenaq et al. |
| 2017/0240285 A1 | 8/2017 | Strobl et al. |

FOREIGN PATENT DOCUMENTS

| | | |
|---|---|---|
| CA | 2091526 A1 | 10/1993 |
| CA | 2112960 C | 12/2002 |
| CA | 2450744 A1 | 2/2003 |
| DE | 4019402 A1 | 12/1991 |
| DE | 69019765 T2 | 7/1995 |
| DE | 4421688 C1 | 12/1995 |
| EP | 0026564 A1 | 4/1981 |
| EP | 0254383 A2 | 1/1988 |
| EP | 0363062 A2 | 4/1990 |
| EP | 0380442 A2 | 8/1990 |
| EP | 0401455 A1 | 12/1990 |
| EP | 0404730 A1 | 12/1990 |

(56) References Cited

FOREIGN PATENT DOCUMENTS

| | | | |
|---|---|---|---|
| EP | 0449772 | A1 | 10/1991 |
| EP | 0519296 | A1 | 12/1992 |
| EP | 0561274 | A1 | 9/1993 |
| EP | 0608564 | A1 | 8/1994 |
| EP | 1153789 | A2 | 11/2001 |
| EP | 1447021 | A1 | 8/2004 |
| FR | 1298012 | A | 7/1962 |
| GB | 888436 | A | 1/1962 |
| GB | 1047761 | | 11/1966 |
| GB | 1582973 | A | 1/1981 |
| GB | 2055952 | A | 3/1981 |
| GB | 2356890 | A | 6/2001 |
| JP | 52055120 | A | 5/1977 |
| JP | 63141852 | A | 6/1988 |
| JP | 63247150 | A | 10/1988 |
| JP | 10119611 | A | 5/1998 |
| JP | 2001138858 | A | 5/2001 |
| WO | 1986003386 | A | 6/1986 |
| WO | 2003009717 | A2 | 2/2003 |
| WO | 2004004507 | A1 | 1/2004 |
| WO | 2006041859 | | 4/2006 |
| WO | 2010027853 | A1 | 3/2010 |

OTHER PUBLICATIONS

Global Seating Systems LLC, "CCOPS Cobra: Soldier Survival System," 1 page, undated.
Holmbergs, "Art.No. 63/4959-XX and 63/4958-XX GR.1 Buckle, ⅗ point," accessed Sep. 15, 2010, www.holmbergs.se, 2 pages.
Holmbergs, "Gr. 0+ 3-point buckle with plastic chassi and tongues," accessed Sep. 15, 2010, http://www.holmbergs.se/1/1.0.1.0/70/1/, 1 page.
Holmbergs, "Gr. 1 Buckle, Viking," accessed Sep. 15, 2010, http://www.holmbergs.se1/1/1.0.1.0/53/1/, 1 page.
Holmbergs, "Group 1 Systems," accessed Sep. 15, 2010, http://www.holmbergs.se/1/1.0.1.0/87/1/, 1 page.
Holmbergs, Infant buckle with steel tongues, accessed Sep. 15, 2010, http://www.holmbergs.se/1/1.0.1.0/74/1/, 1 page.
Holmbergs, "Infant buckle. 5-point with plastic chassi and plastic tongues," accessed Sep. 15, 2010, http://www.holmbergs.se/1/1.0.1.0/73/1/, 1 page.
Novarace, "DL: Group 1 Buckle," accessed Sep. 15, 2010, http://www.novarace.com/index.php?option=com_content&task=view&id=36&Itemid=48, 1 page.
Novarace, "GT 3: Group 0 Buckle," accessed Sep. 15, 2010, http://www.novarace.com/index.php?option=com_content&task=view&id=33&Itemid=46, 1 page.
Novarace, "GT 5: Group 0 Buckle," accessed Sep. 15, 2010, http://www.novarace.com/index.php?option=com_content&task=view&id=30&Itemid=44, 1 page.
Novarace, "GT: Group 1 Buckle," accessed Oct. 8, 2010, http://www.novarace.com/gt.htm, 1 page.
Novarace, "KMA 1: Group 1 Buckle," accessed Sep. 15, 2010, http://www.novarace.com/index.php?option=com_content&task=view&id=34&Itemid=47, 1 page.
Sabelt Catalog, "SAB104: Standard tongue hole to facilitate webbing insert," p. 23, 1 page.
Sabelt, "Daphne 0: Fiberglass-plastic buckle with metal pin latch," accessed Sep. 15, 2010, http://childsafety.sabelt.com/index.php/eshop/product/Sabelt-Racing-DAPHNE-0.html/1/, 1 page.
Sabelt, "RO1000: Fiberglass-plastic buckle with metal pin latch," accessed Sep. 15, 2010, http://childsafety.sabelt.com/index.php/eshop/product/Sabelt-Racing_RO1000.html/1/pid/1, 1 page.
Sabelt, "SAB004: Fiberglass-plastic buckle with metal pin latch," accessed Sep. 15, 2010, http://childsafety.sabelt.com/index.php/eshop/product/Sabelt-Racing-SAB004.html/1/pid/1, 1 page.
Sabelt, "SABUSA004: Fiberglass-plastic buckle with metal pin latch," accessed Sep. 15, 2010, http://childsafety.sabelt.com/index.php/eshop/product/Sabelt-Racing-SABUSA004.html/1/, 1 page.
International Search Report and Written Opinion dated Apr. 13, 2018; International Application No. PCT/US2018/017122; 7 pages.

* cited by examiner

WEB ADJUSTER

CROSS-REFERENCE TO RELATED APPLICATION

This application claims priority to U.S. Provisional Patent Application No. 62/455,915, titled "WEB ADJUSTER," and filed Feb. 7, 2017, which is incorporated herein by reference in its entirety.

TECHNICAL FIELD

The present disclosure is generally directed to web adjusters for use with seat belts or other webs.

BACKGROUND

There are many types of personal restraint systems used in automobiles, utility task vehicles (UTVs), and other vehicles. Small children, for example, are typically secured in a portable child seat that can be mounted to a passenger seat in an automobile or other vehicle. The child seat can be secured to the passenger seat by attaching one or more straps, belts, etc. (e.g., webs) from the child seat to corresponding anchor points in the vehicle, and then adjusting the tension in the webs to securely hold the child seat in place. The length and/or tension in the web is typically adjusted with a web adjustor that joins two sections of web together. Conventional web adjusters are disclosed in, for example, U.S. Pat. Nos. 5,160,186 and 3,872,550, both of which are incorporated herein by reference in their entireties. A tilt-lock adjuster is a web adjustment device that releases the web for the purpose of increasing the length when the adjuster is held at an angle (i.e., tilted) relative to the web, but enables the web to be shortened by pulling the free end of the web through the adjuster.

DETAILED DESCRIPTION

The following disclosure describes various embodiments of web adjusters and other web-related devices for use with personal restraint systems in land vehicles and other vehicles. In some embodiments, web adjusters configured in accordance with the present technology have frames with web gripping features configured to reduce web misalignment in use. Certain details are set forth in the following description and in FIGS. 1A-4C to provide a thorough understanding of various embodiments of the present technology. In other instances, well-known structures, materials, operations and/or systems often associated with seatbelt webs, web adjusters and other personal restraint system hardware are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1A:
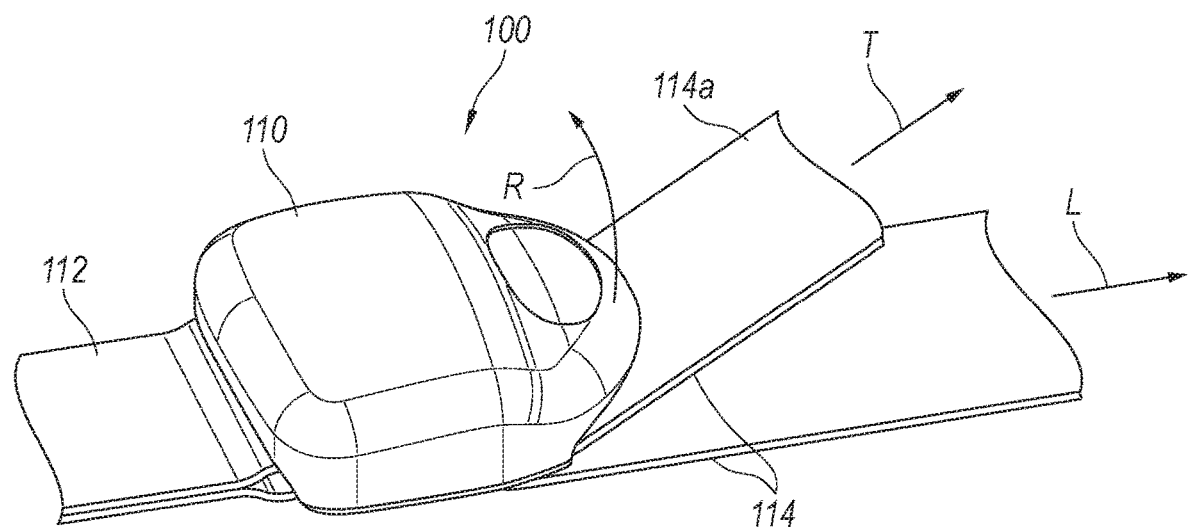
FIGS. 1A and 1B are isometric and cross-sectional isometric views, respectively, of a web adjuster configured in accordance with an embodiment of the present technology.
Figure 1B:
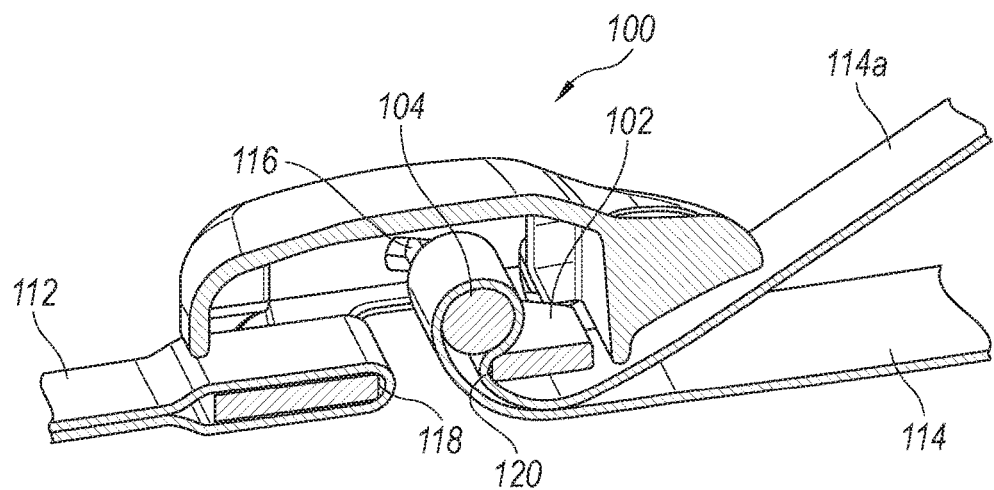
Figure 1C:
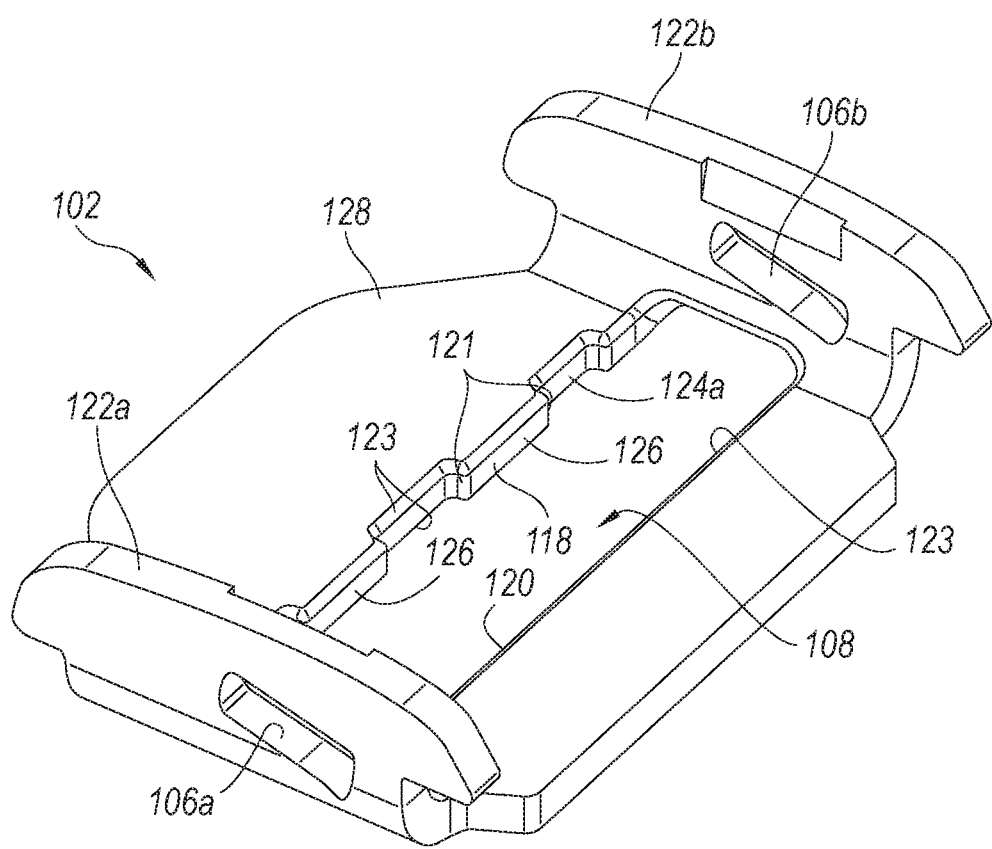
FIGS. 1C and 1D are isometric and top views, respectively, of a frame of the web adjuster shown in FIGS. 1A and 1B.
Figure 1D:
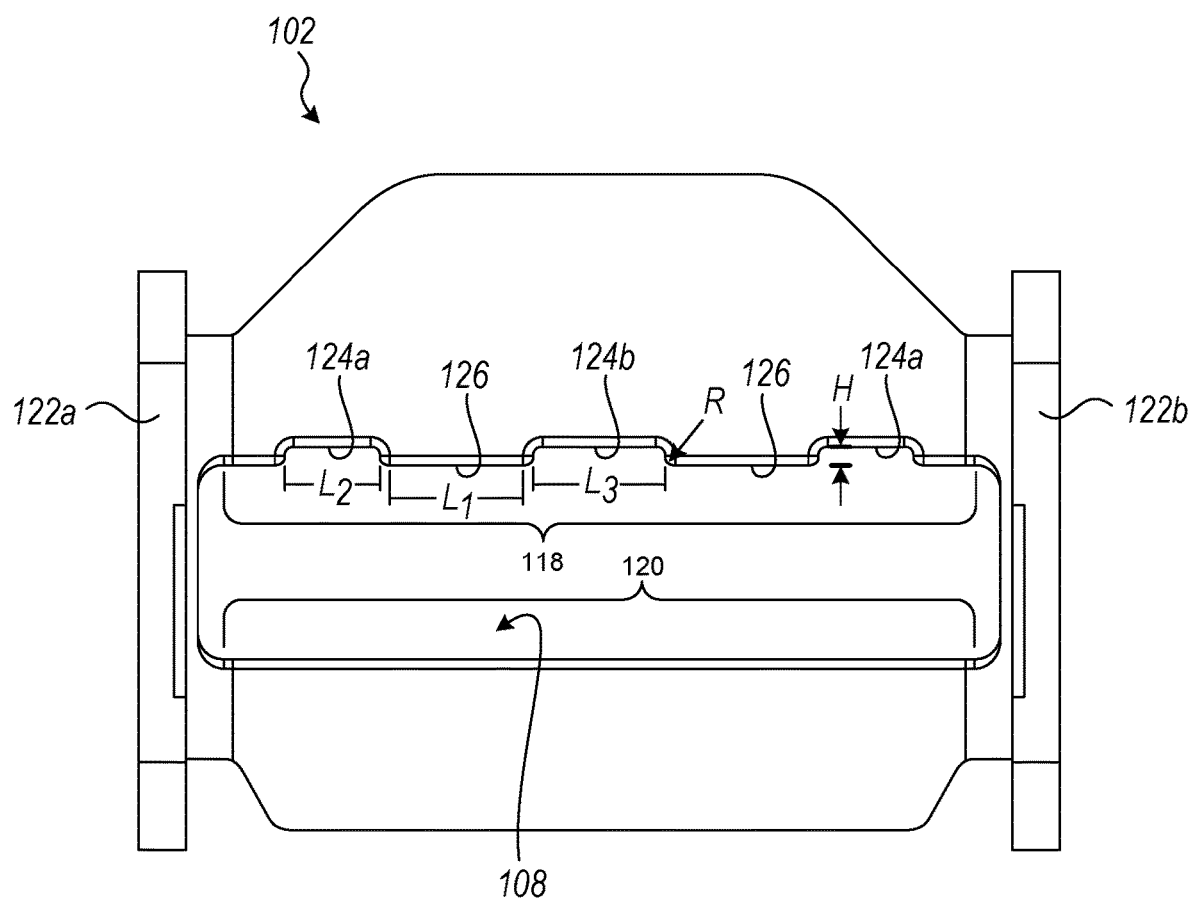

FIGS. 1A and 1B are isometric and cross-sectional isometric views, respectively, of a web adjuster 100 having a frame 102 configured in accordance with an embodiment of the present technology. FIGS. 1C and 1D are enlarged isometric and top views, respectively, of the frame 102. Referring first to FIGS. 1C and 1D together, in the illustrated embodiment the frame 102 includes a first sidewall portion 122a and a second sidewall portion 122b extending upwardly from opposite sides of a base portion 128. The base portion 128 includes a web aperture 108 (e.g. a generally rectangular web aperture) that extends generally lengthwise across the base portion 128 between the sidewall portions 122, *b*. The web aperture 108 includes a first edge 118 (e.g., an "anchor side" edge) opposite a second edge 120 (e.g., an "adjust side" edge).

In one aspect of this embodiment, at least a portion of the first edge 118 has a nonlinear shape defined by a plurality of recessed portions 124 (identified as recessed portions 124a and 124b) separated by corresponding raised portions 126 (which can also be referred to as "projections" or "protrusions"). As described in greater detail below, the alternating recessed/raised portions form web gripping features that can prevent a web that extends around the first edge 118 from sliding from one side of the frame 102 to the other side if, for example, the web is pulled in a direction that is not perpendicular to the first edge 118. In some embodiments, the first edge 118 can include at least two raised portions 126 and at least three recessed portions 124. More particularly, with reference to FIG. 1D, in some embodiments, the first edge 118 can include two outer recessed portions 124a and an inner recessed portion 124b. In some embodiments, each of the raised portions 126 can have a length $L_1$ between 3.0-10.0 mm (e.g., about 8.0 mm) and a height H between 0.10-2.5 mm (e.g., about 1.0 mm) selected to inhibit the web from moving sideways relative to the frame 102. In some embodiments, the outer recessed portions 124a can have a length $L_2$ less than a length $L_3$ of the inner recessed portion 124b. For example, in some embodiments, the length $L_2$ can be about 5.0 mm and the length $L_3$ can be about 7.0 mm. In other embodiments, the raised portions 126 and the recessed portions 124 can have other dimensions, and in some embodiments, individual ones of the raised portions 126 and/or recessed portions 124 can have the same or different lengths. Additionally, although the raised and recessed portions 124, 126 have generally "squared-off" corners in the illustrated embodiment, the raised portions 126 can have lateral corners 121 that are rounded with a radius R of, for example, about 0.50 mm. The height H, length $L_1$, and/or the radius R of the lateral corners 121 of the raised portions 126 can be selected to secure the web without cutting or otherwise degrading the web under a load or in normal use. The foregoing dimensions are illustrative of one embodiment of the present technology. Accordingly, other embodiments can have other dimensions in accordance with the present disclosure. For example, in some embodiments, each of the lengths $L_1$, $L_2$, and $L_3$ can be generally the same.

In another aspect of the embodiment illustrated in FIG. 1C, corners 123 between the first edge 118 and the second edge 120 and the upper and lower surfaces of the base portion 128 are generally rounded with a radius selected to inhibit the respective webs from slipping through the web aperture 108 without cutting or otherwise degrading the webs under a load or in normal use. In some embodiments, for example, the radius of the corners 123 can be between 0.30-0.70 mm. In other embodiments, the corners 123 can have different dimensions.

Although the illustrated embodiment depicts a series of alternating recessed portions 124 and raised portions 126 having a generally square or rectangular periodic configuration, in other embodiments the first edge 118 can include a variety of other web gripping features configured to prevent the web from sliding from side to side in the web aperture 108. Such web gripping features can include, for example, a series of curved alternating raised and recessed portions (having, e.g., a sinusoidal shape), a saw tooth configuration, a series of adjacent bumps or scallops, and/or other nonlinear edge features, etc.

Referring next to FIGS. 1A and 1B together with FIG. 1C, each of the sidewall portions 122a, b includes a corresponding opening or slot 106a, b that is configured to slideably receive an end portion (e.g., a generally rectangular end portion) of a cross bar 104 (FIG. 1B). Additionally, the web adjuster 100 includes a cover or housing 110 that is securely attached to the sidewall portions 122a, b. As shown in, for example, FIG. 1B, the cover 110 encloses an upper portion of the frame 102 as well as the cross bar 104, while leaving the web aperture 108 open. The frame 102, the cross bar 104, and the cover 110 can be manufactured using suitable materials and methods known in the art. For example, in some embodiments, the frame 102 can be formed from a suitable steel, such as steel plate that is stamped and formed to shape, the cross bar 104 can be cast or machined from a suitable steel, and the cover 110 can be injection molded from a suitable plastic.

To use the web adjuster 100, a first web 112 can be looped through the web aperture 108 and around the first edge 118 before being stitched or otherwise attached to itself to securely attach the first web 112 to the frame 102. As described in greater detail below, the opposite end of the first web 112 (e.g., the "tag end") can carry, for example, a latch or other device to fixedly attach the first web 112 to an anchor in a vehicle. A second web 114 can be routed through the web aperture 108 and around the cross bar 104, and then back out the web aperture 108. The second web 114 includes a free end portion 114a, and an opposite end that is spaced apart from the web adjuster 100. As also described in greater detail below, the opposite end of the second web 114 can be secured to, for example, a child seat so that the first web 112 and the second web 114 together form a combined web that secures the child seat to the vehicle. The webs 112 and 114 can be any manner of conventional restraint straps, seat belt webs, etc. well known in the art, and can be constructed of various suitable materials known in the art, such as woven nylon.

Figure 2:
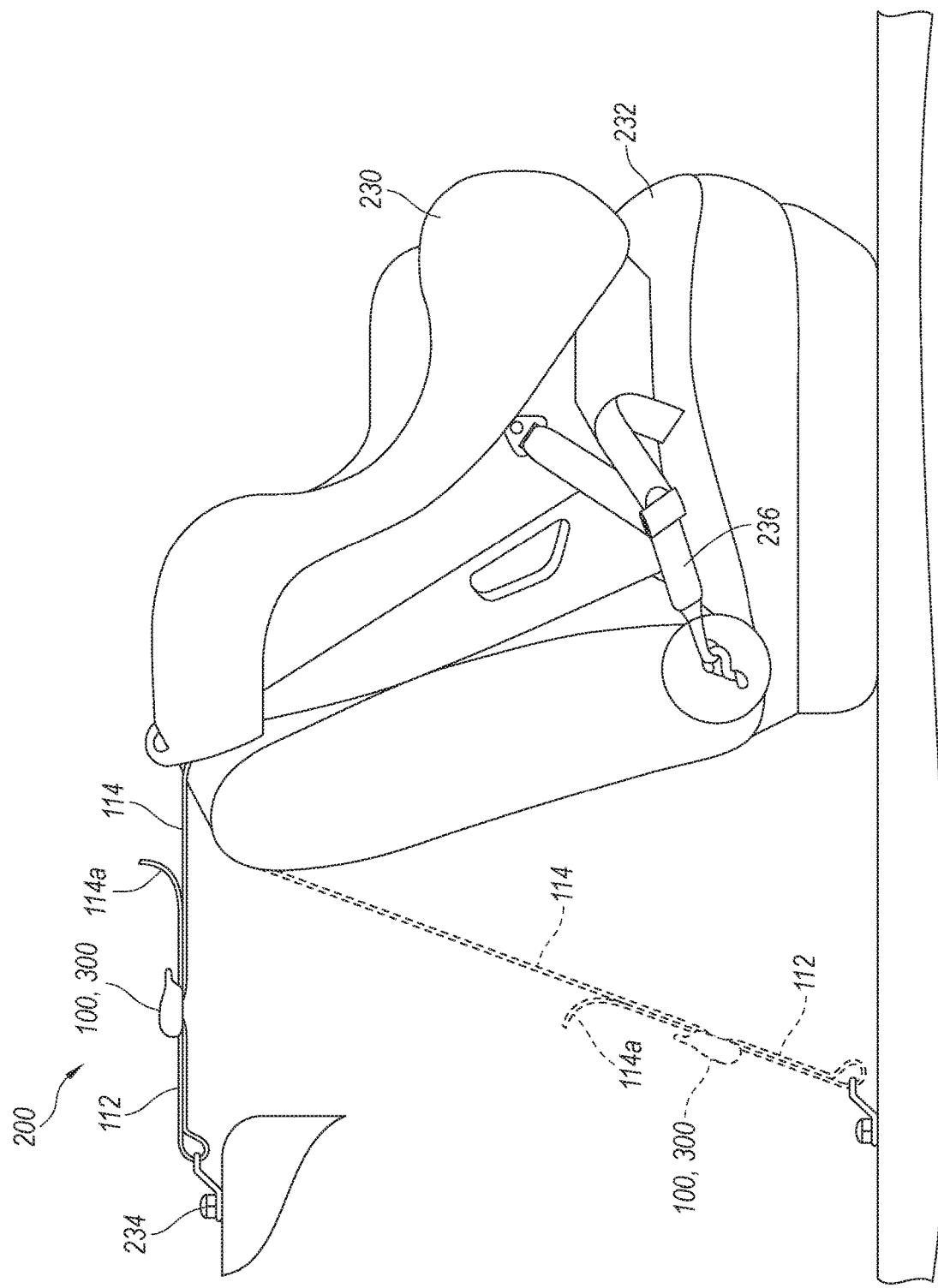
FIG. 2 is a side view of a child seat secured to a vehicle seat with a restraint system having a web adjuster configured in accordance with an embodiment of the present technology.

The web adjuster 100 can be used in a wide variety of applications. FIG. 2, for example, is a side view of a child seat 230 secured in a car seat 232 with a restraint system 200 that includes the web adjuster 100 described in detail above. In the illustrated embodiment, an upper portion of the child seat 230 is securely attached to an upper anchor 234 in a vehicle by means of the first web 112 and the second web 114 which are coupled together by the web adjustor 100. Although the upper portion of the child seat 230 is secured to the upper anchor 234, in other embodiments the upper portion of the child seat 230 and/or other portions of the child seat 230 can be secured to a lower anchor 238 by means of the first and second webs 112 and 114 and the web adjuster 100. The lower portion of the child seat 230 can be secured to the car seat 232 with additional restraints, such as a restraint 236 of a type well known to those of ordinary skill in the art. In other embodiments, the web adjuster 100 can be used with various other web arrangements without departing from the spirit or scope of the present disclosure.

Referring to FIGS. 1A-2 together, in operation, the user can increase the tension in the first web 112 and the second web 114 by grasping the free end portion 114a and pulling it in direction T as shown in FIG. 1A. Pulling the free end portion 114a drives the cross bar 104 away from the second edge 120 of the frame 102 (FIGS. 1C and 1D), increasing the space therebetween and enabling the free end portion 114a to pull through the web aperture 108, thereby creating tension in the second web 114 in direction L. When the user releases the free end portion 114a, the tension in the web 114 drives the cross bar 104 back against the second edge 120, thereby locking the web 114 in position and maintaining the tension in the first and second webs 112 and 114. To release the tension in the first and second webs 112 and 114 so that, for example, the child seat 230 can be removed from the car seat 232, the user can rotate (i.e., tilt) the web adjuster 100 upwardly in direction R as shown in FIG. 1A. When this happens, it enables the cross bar 104 to slide in the slots 106a, b away from the second edge 120, thereby increasing the space therebetween and enabling the free end portion 114a to slide back into the web adjuster 100 to reduce the tension in the web 114. Accordingly, in the illustrated embodiment the web adjuster 100 can be referred to as a "tilt-lock" web adjuster because it can be tilted as described above to release the second web 114, and tilted back into position to lock the second web 114.

Figure 3:
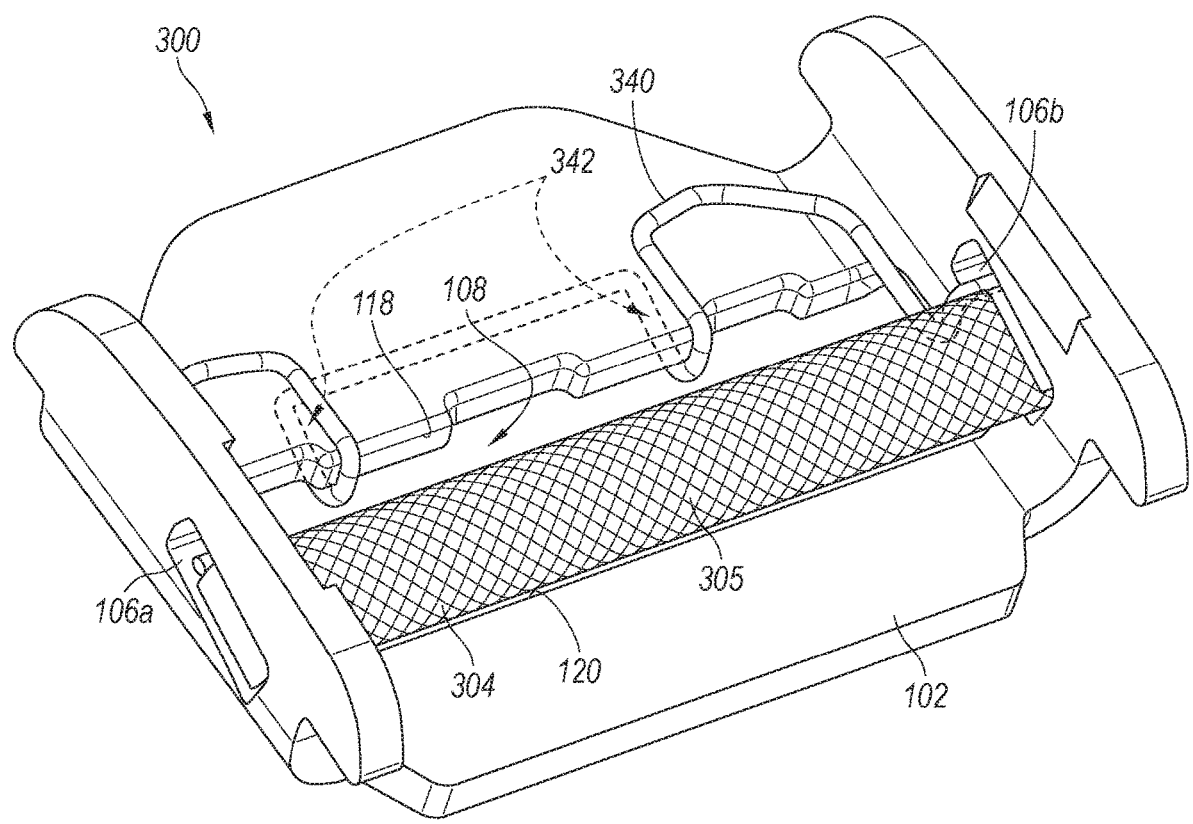
FIG. 3 is an isometric view of a web adjuster configured in accordance with another embodiment of the present technology.

In some embodiments, the web adjuster 100 can include additional components and/or features configured in accordance with the present technology to facilitate operation and use. FIG. 3, for example, is an enlarged isometric view of a web adjuster 300 having a frame 102 and a cross bar 304. The web adjuster 300 is similar in structure and function to the web adjuster 100 described in detail above and can include a housing 110 that is omitted from FIG. 3 for purposes of clarity. In the illustrated embodiment, the cross bar 304 has a textured surface 305 configured to grip the second web 114. For example, the surface 305 can have a plurality of features (e.g., teeth, bumps, grooves, etc.) that help to grip the second web 114 to, for example, inhibit movement of the second web 114 through the web aperture 108 when the cross bar 304 is pressed toward the second edge 120. In some embodiments, the surface 305 is a knurled (e.g., diamond-knurled), etched, or otherwise textured surface. Additionally, in the illustrated embodiment, the cross bar 304 has a generally oblong (e.g., oval or elliptical) cross-sectional shape rather than a circular cross-sectional shape. In other embodiments, however, the cross bar 304 can have a circular, square, rectangular, polygonal, irregular, or other cross-sectional shape with or without a textured surface.

In some embodiments, the web adjuster 300 can include a biasing member 340 (e.g., a spring) configured to bias the cross bar 304 toward the second edge 120. In the illustrated embodiment, the biasing member 340 can be secured (e.g., clipped) to the frame 102 at the first edge 118 and can contact and press against the cross bar 304 proximate the slots 106a, b. For example, in some embodiments, the biasing member 340 can be formed from spring steel wire, and can include a pocket 342 that is shaped to receive and grasp the base portion 128 proximate to the first edge 118.

Referring to FIGS. 1A, 2 and 3 together, in operation, the user can increase tension in the first web 112 and the second web 114 by gripping the free end portion 114a and pulling in the direction T as described above with reference to FIG. 1A. This drives the cross bar 304 away from the second edge 120. When the user releases the free end portion 114a, the biasing force of the biasing member 340 combines with the tension in the second web 114 to drive the cross bar 304 back toward the second edge 120, thereby locking the second web 114 in position and maintaining the tension in the first and second webs 112 and 114.

Although, in the embodiments illustrated in FIGS. 1A-3 the web gripping features are described in the context of tilt-lock web adjusters, those of ordinary skill in the art will understand that the web gripping features described herein can be utilized with a wide variety of other web coupling devices, including other types of web adjusters, web retractors, latches, attachment fittings, etc. Accordingly, the non-slide web gripping features described herein are not limited to use with any particular web adjuster or web interface device, but can be used with a wide-variety of such devices without departing from the spirit or scope of the present disclosure.

Figure 4A:
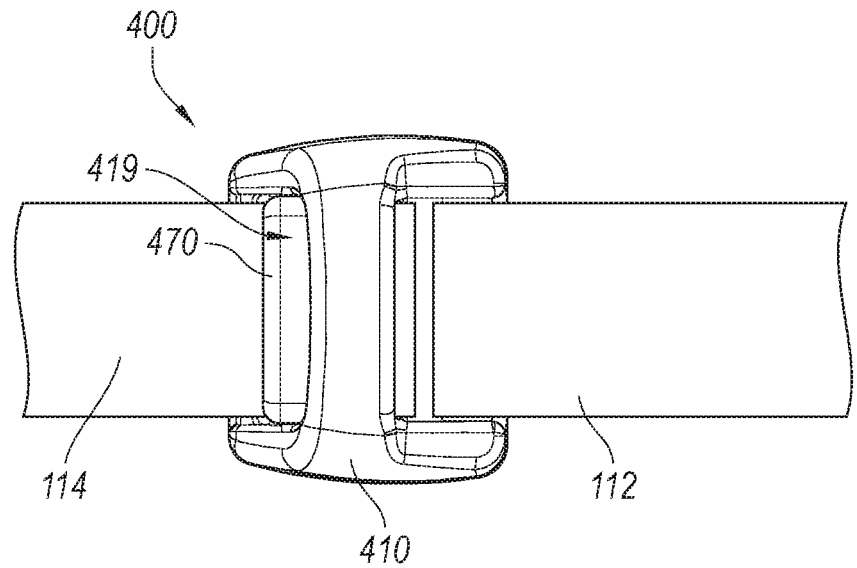
FIGS. 4A-4C are top, cross-sectional side, and exploded views, respectively, of a web adjuster configured in accordance with another embodiment of the present technology.
Figure 4B:
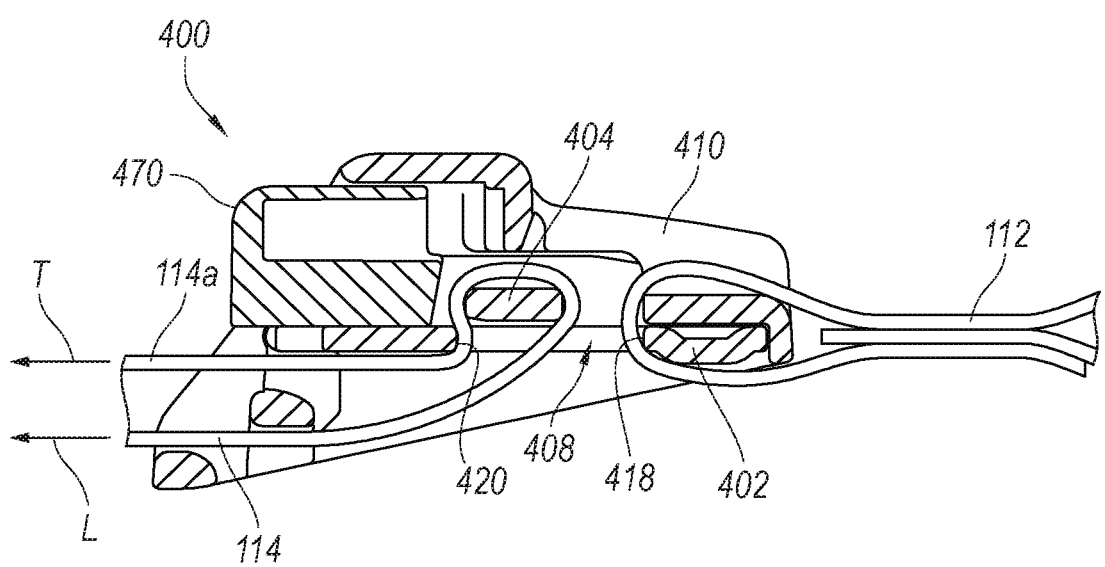
Figure 4C:
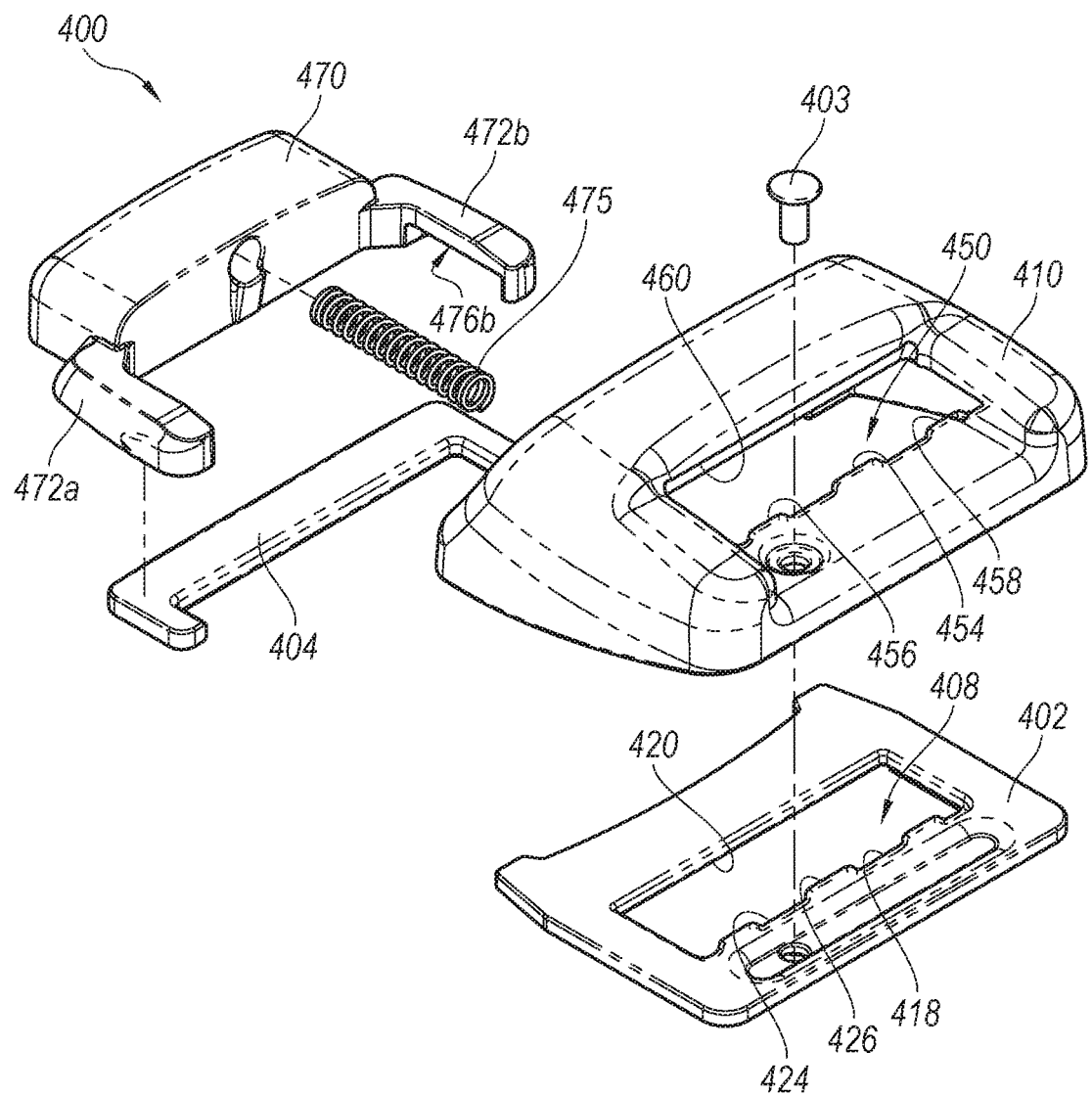

For example, FIGS. 4A-4C are top, cross-sectional side, and exploded views, respectively, of a web adjuster 400 configured in accordance with another embodiment of the present technology. The web adjuster 400 can include some features that are generally similar to the features of the web adjusters 100, 300 described in detail above, and can be used to adjust the tension in the first and second webs 112, 114. However, in contrast to the web adjusters 100, 300, the web adjuster 400 can be a "push-button" type web adjuster. Referring first to FIG. 4C, the web adjuster 400 includes a frame 402 having a web aperture 408, and a cover or housing 410 that can be securely attached to the frame 402 via, for example, a fastener 403 (e.g., a rivet, screw, etc.). In the illustrated embodiment, the web aperture 408 includes a first edge 418 (e.g., an "anchor side" edge) opposite a second edge 420 (e.g., an "adjust side" edge). The first edge 418 can have a nonlinear shape defined by a plurality of recessed portions 424 separated by corresponding raised portions 426. In some embodiments, the recessed portions 424 and the raised portions 426 can have the same shapes and sizes as the recessed portions 124 and the raised portions 126 described in detail above. As described above, the recessed/raised portions form web gripping features that can inhibit a web that extends around the first edge 418 from moving side-to-side relative to the frame 402 if the web is, for example, pulled in a direction that is not perpendicular to the first edge 418.

In another aspect of the illustrated embodiment, the cover 410 can include a web aperture 450 having a first edge 458 and a second edge 460 opposite the first edge 458. In some embodiments, the web aperture 408 in the frame 402 can be generally aligned with the web aperture 450 in the cover, and/or the first edge 458 can have the same or a generally similar shape as the first edge 418 of the frame 402. For example, the first edge 458 can have a nonlinear shape (e.g., including alternating raised portions 456 and recessed portions 454 forming web gripping features) that matches the shape of the first edge 418 for inhibiting side-to-side movement of a web that extends around the first edge 458. In other embodiments, only one of the first edges 418, 458 can include web gripping features for securing the web. For example, in some embodiments the raised portions 426 can extend beyond the first edge 458 of the cover 410 toward the second edge 420, and the first edge 458 can be straight. In other embodiments, the raised portions 456 of the cover 410 can extend beyond the first edge 418 of the frame 402 in the direction toward the second edge 460.

As further shown in FIG. 4C, the web adjuster 400 can include a push button 470 having a first arm portion and 472a and a second arm portion 472b. Each of the arm portions 472a, b includes a corresponding opening or slot 476a, b (only the slot 476b is visible in FIG. 4C) that is configured to receive and secure an end portion (e.g., a generally rectangular end portion) of a cross bar 404. In the illustrated embodiment, a biasing member 475 (e.g., a spring) extends between and contacts the push button 470 and the cover 410. As shown in, for example, FIG. 4A, the push button 470 can be slidably received within a button aperture 419 in the cover 410. As shown in, for example, FIG. 4B, the cover 410 is attached to the frame 402 and encloses the cross bar 404, while leaving the web aperture 408 generally open.

Referring to FIGS. 4A-4C together, to use the web adjuster 400, the first web 112 can be looped through the web apertures 408, 450 and around the first edges 418, 458 before being stitched or otherwise attached to itself to securely attach the first web 112 to the frame 402. The second web 114 can be routed through the web aperture 408 and around the cross bar 404, and then back out the web aperture 408. The user can increase tension in the first web 112 and the second web 114 by gripping the free end portion 114a and pulling in the direction T (FIG. 4B). This drives the cross bar 404 away from the second edge 420 of the web aperture 408, increasing the space therebetween and enabling the free end portion 114a to pull through the web aperture 408, thereby creating tension in the second web 114 in the direction L (FIG. 4B). Driving the cross bar 404 away from the second edge 420 causes the push button 470 to move inward through the button aperture 419 and at least partially into the cover 410. In some embodiments, while pulling the free end portion 114a in the direction T, the user can push the push button 470 inward to further increase or maintain the spacing between the cross bar 404 and the second edge 420. When the user releases the free end portion 114a, the biasing force of the biasing member 475 combines with the tension in the second web 114 to drive the cross bar 404 toward the second edge 420, thereby locking the second web 114 in position and maintaining the tension in the first and second webs 112 and 114. Driving the cross bar 404 toward the second edge 420 causes the bush button 470 to move outwardly through the button aperture 419 and at least partially out of the cover 410.

To release the tension in the first and second webs 112 and 114, the user can push the push button 470 inward to drive the cross bar 404 away from the second edge 420, thereby increasing the space therebetween and enabling the free end portion 114a to slide back into the web adjuster 400 to reduce the tension in the web 114. Accordingly, in the illustrated embodiment the web adjuster 100 can be referred to as a "push-button" web adjuster because it can be actuated as described above to release the second web 114, and released to lock the second web 114.

In conventional web adjusters in which the web loops around a straight interface edge for attachment to the adjuster frame, the web may have a tendency to slide to one side of the edge or the other in use, especially if the web is pulled or otherwise placed in tension at an angle that is not perpendicular to, or at least substantially perpendicular to, the edge. This can occur, for example, if the tag end of a web is secured to the adjuster frame around a straight edge, and the free end of a web looped around the cross bar is pulled in a direction that is not perpendicular to the straight edge. For example, loads on the web during a vehicle accident can potentially cause sliding of the web to one side or the other of the adjuster. Sliding of the web may increase the stress on the web in use and may reduce the load-carrying capability of the web. Providing the web interface edges of web adjusters with the web gripping features described above with reference to FIGS. 1C and 4C (e.g., scalloped edges, nonlinear edges, etc.), however, can prevent this undesirable sliding—thereby preserving the load-carrying capability of the web—by creating friction and/or interference that prevents or at least substantially reduces movement of the web to one side of the adjuster or the other.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A restraint system, comprising:
   a web; and
   a web adjuster, wherein the web adjuster includes:
     a frame having a web aperture, wherein the web aperture has an edge with a nonlinear shape, and wherein the web is looped around the edge and attached to itself to securely attach the web to the frame.

2. The restraint system of claim 1 wherein the frame includes a base portion, wherein the edge of the web aperture extends across at least a portion of the base portion between opposite sides thereof, and wherein the edge is configured to inhibit side to side movement of the web relative to the edge.

3. The restraint system of claim 1 wherein the edge has alternating raised and recessed portions.

4. The restraint system of claim 3 wherein the raised portions have straight edges contacting the web.

5. The restraint system of claim 4 wherein the raised portions are generally rectangular.

6. The restraint system of claim 3 wherein the raised portions have curved edges contacting the web.

7. The restraint system of claim 3 wherein the raised portions have a height of about 1.0 mm relative to the recessed portions.

8. The restraint system of claim 1 wherein the web aperture has a generally rectangular shape, and wherein the edge is a long edge of the web aperture having one or more projections.

9. The restraint system of claim 1 wherein:
   the frame includes a base portion and first and second sidewall portions extending upwardly from the base portion;
   the web aperture extends through the base portion between the first and second sidewall portions;
   the edge extends generally perpendicular to the first and second sidewall portions; and
   the edge includes a plurality of projections.

10. The web adjuster of claim 9 wherein first edge inhibits the web from moving in a direction perpendicular to the first and second sidewall portions.

11. A restraint system, comprising:
    a first web;
    a second web;
    a web adjuster, wherein the web adjuster includes:
      a frame having a web aperture, a base portion, and first and second sidewall portions extending from opposite sides of the base portion, wherein the web aperture has an edge with a nonlinear shape; and
      a cross bar movably extending between the first and second sidewall portions, the cross bar having a textured surface,
        wherein the first web extends through the web aperture and around the edge to secure the first web to the frame, and
        wherein the second web extends through the web aperture and around the textured surface of the cross bar to secure the second web to the frame.

12. The restraint system of claim 11 wherein the edge is a first edge, wherein the web aperture includes a second edge opposite the first edge, and wherein the web adjuster further comprises a biasing member configured to bias the cross bar toward the second edge.

13. A web adjuster, comprising:
    a base portion;
    first and second sidewall portions extending upwardly from the base portion;
    an aperture in the base portion between the first and second sidewall portions, wherein the aperture includes a first edge and a second edge opposite the first edge, wherein the first edge extends generally perpendicular to the first and second sidewall portions, and wherein the first edge includes a plurality of projections; and
    a cross bar movably coupled to the first and second sidewall portions, the cross bar having a textured surface configured to at least partially grip a web extending through the aperture and around the cross bar.

14. The web adjuster of claim 13 wherein the cross bar has an oblong cross-section.

15. The web adjuster of claim 13, further comprising a biasing member secured to the base portion at the first edge, wherein the biasing member engages the cross bar proximate the first and second sidewall portions to bias the cross bar toward the second edge.

16. The web adjuster of claim 13 wherein:
    the web is a first web; and
    the projections are configured to reduce side to side movement of a second web relative to the base portion when the second web extends through the aperture and around the first edge.

17. The web adjuster of claim 13 wherein the projections include a plurality of raised and recessed edge portions.

18. The web adjuster of claim 17 wherein the raised edge portions are generally straight.

19. The web adjuster of claim 13 wherein the web is a first web, and further comprising a second web, wherein the second web is looped around the first edge and attached to itself to securely attach the second web to the frame.

20. The web adjuster of claim 19 wherein the first edge is configured to inhibit side to side movement of the second web relative to the first edge.

* * * * *